(12) United States Patent
Wilmot

(10) Patent No.: US 7,748,734 B2
(45) Date of Patent: Jul. 6, 2010

(54) TWIST RESISTANT HEAD SIDE AIRBAG

(75) Inventor: Larry M. Wilmot, Oxford, MI (US)

(73) Assignee: TK Holdings Inc., Auburn Hills, MI (US)

( * ) Notice: Subject to any disclaimer, the term of this patent is extended or adjusted under 35 U.S.C. 154(b) by 679 days.

(21) Appl. No.: 11/580,240

(22) Filed: Oct. 13, 2006

(65) Prior Publication Data

US 2007/0090630 A1 Apr. 26, 2007

Related U.S. Application Data

(60) Provisional application No. 60/726,266, filed on Oct. 14, 2005.

(51) Int. Cl.
*B60R 21/213* (2006.01)

(52) U.S. Cl. .................. 280/730.2; 280/728.2

(58) Field of Classification Search .............. 280/728.2, 280/730.2
See application file for complete search history.

(56) References Cited

U.S. PATENT DOCUMENTS

| | | | | |
|---|---|---|---|---|
| 5,899,486 A | * | 5/1999 | Ibe | 280/728.2 |
| 6,412,810 B1 | * | 7/2002 | Wipasuramonton et al. | 280/730.2 |
| 6,517,110 B1 | * | 2/2003 | Butters et al. | 280/749 |
| 6,705,635 B2 | * | 3/2004 | Hoeft et al. | 280/728.2 |
| 6,851,702 B2 | * | 2/2005 | Henderson et al. | 280/728.2 |
| 6,902,187 B2 | * | 6/2005 | Sonnenberg | 280/730.2 |
| 7,125,038 B2 | * | 10/2006 | Gammill | 280/728.2 |
| 7,261,315 B2 | * | 8/2007 | Hofmann et al. | 280/730.2 |
| 7,328,911 B2 | * | 2/2008 | Chapman | 280/728.2 |
| 7,331,598 B2 | * | 2/2008 | Inazu et al. | 280/728.2 |
| 7,370,878 B2 | * | 5/2008 | Nakazawa | 280/728.2 |
| 7,625,005 B2 | * | 12/2009 | Saberan et al. | 280/730.2 |
| 2002/0125705 A1 | * | 9/2002 | Wong et al. | 280/743.2 |
| 2003/0184057 A1 | * | 10/2003 | Kumagai | 280/728.3 |
| 2004/0201207 A1 | * | 10/2004 | Ochiai et al. | 280/730.2 |
| 2005/0057023 A1 | * | 3/2005 | Burton et al. | 280/730.2 |
| 2005/0206135 A1 | * | 9/2005 | Nelson et al. | 280/728.2 |
| 2006/0061075 A1 | * | 3/2006 | Aoki et al. | 280/730.2 |
| 2009/0102166 A1 | * | 4/2009 | Brown et al. | 280/728.2 |

* cited by examiner

*Primary Examiner*—Paul N Dickson
*Assistant Examiner*—Laura Freedman
(74) *Attorney, Agent, or Firm*—Foley & Lardner LLP

(57) ABSTRACT

The disclosed airbag module can be used in the storage, handling, and installation of airbags to a motor vehicle. One embodiment of the airbag module can comprise: an airbag for protecting a vehicle occupant; and an anti-twist assembly attached to the airbag for preventing the airbag from twisting and for preventing the airbag from being stretched during installation.

20 Claims, 11 Drawing Sheets

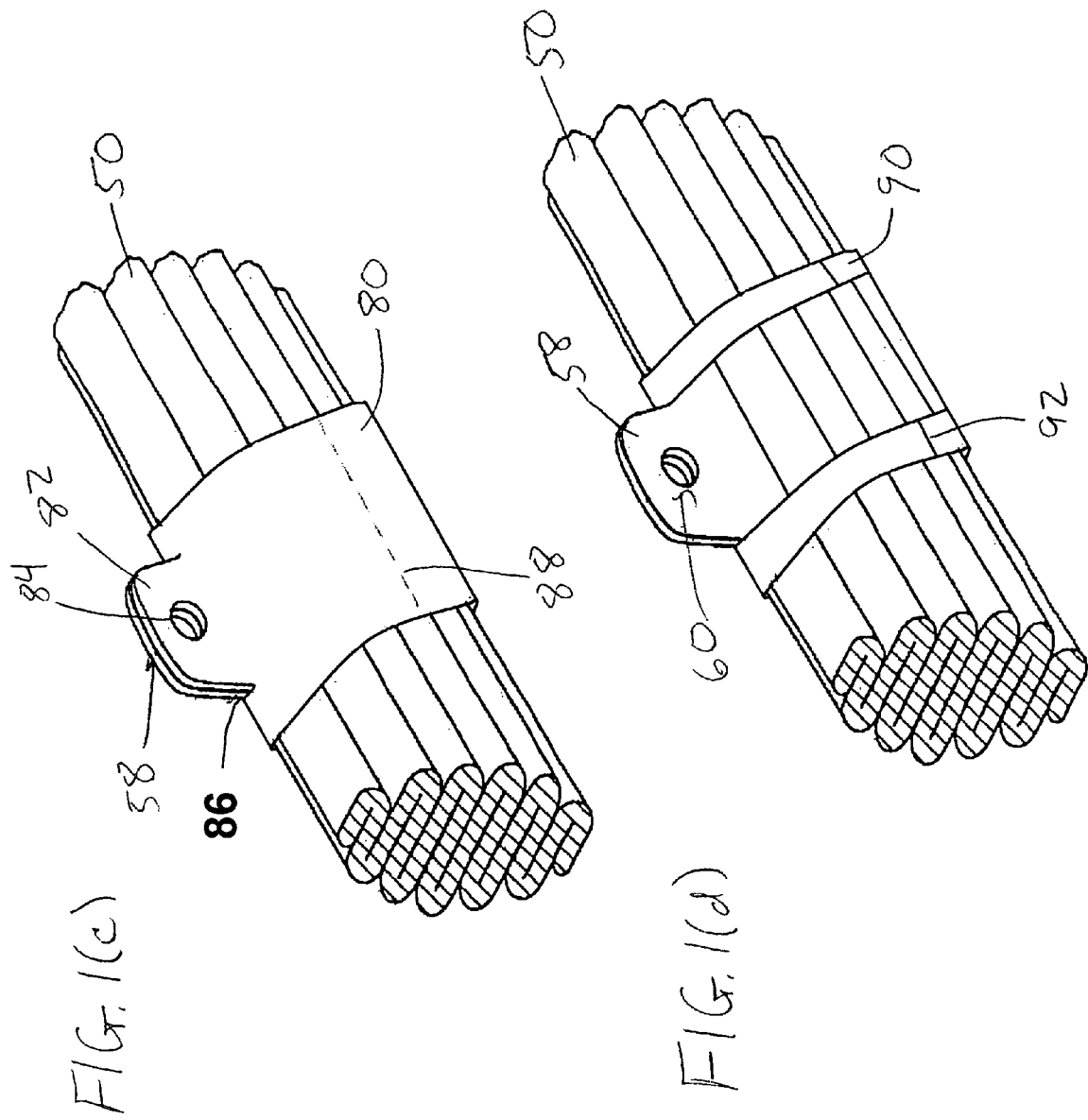

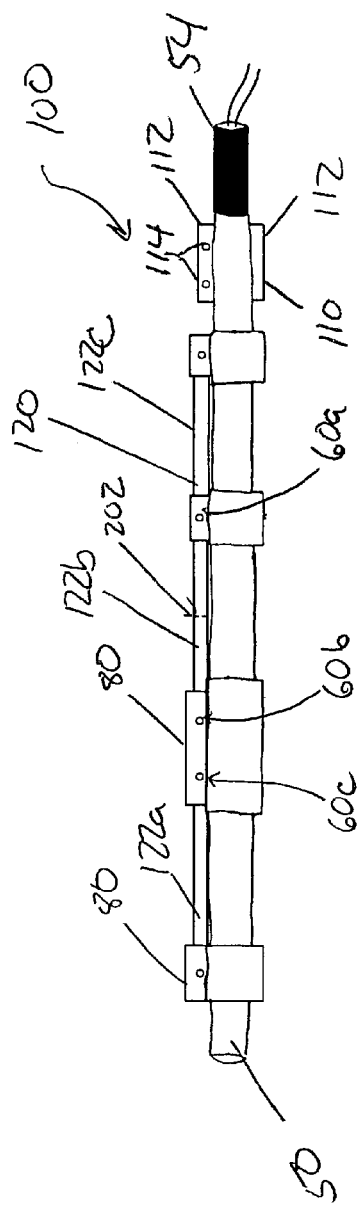
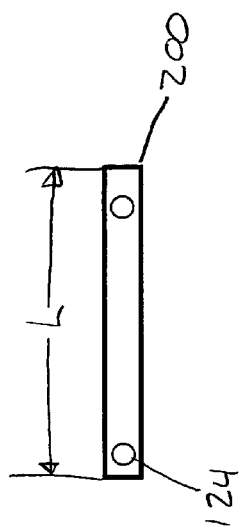
FIG. 2
FIG. 3

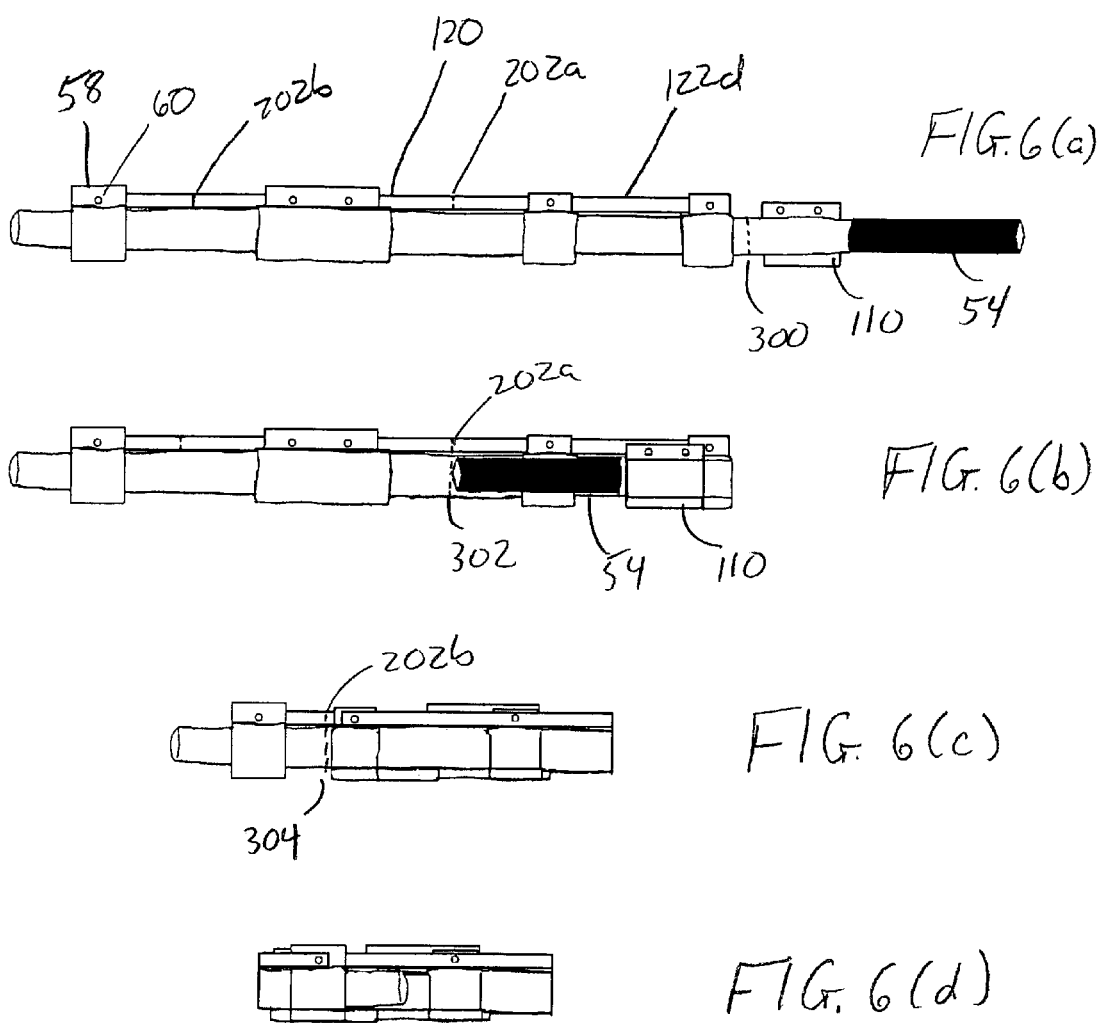

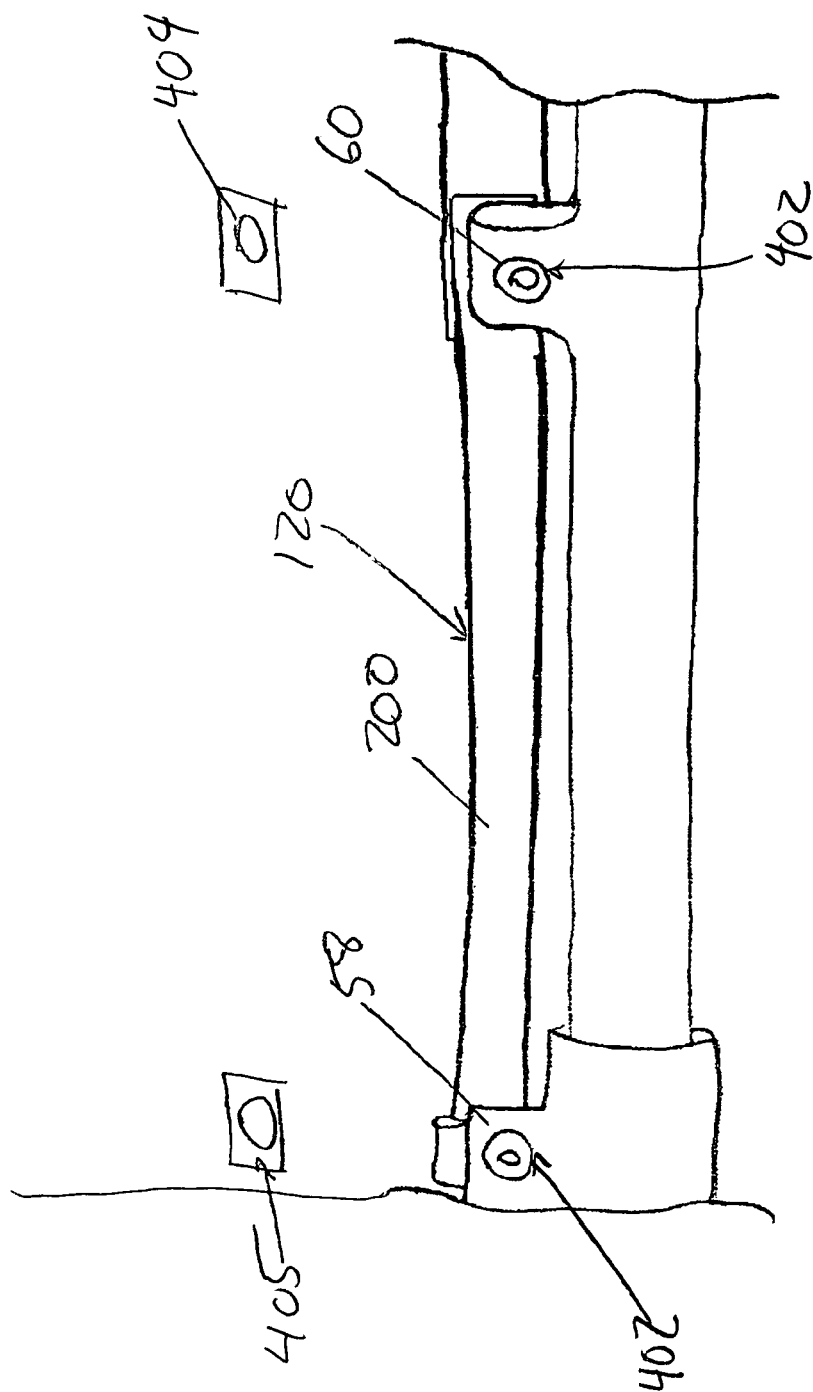

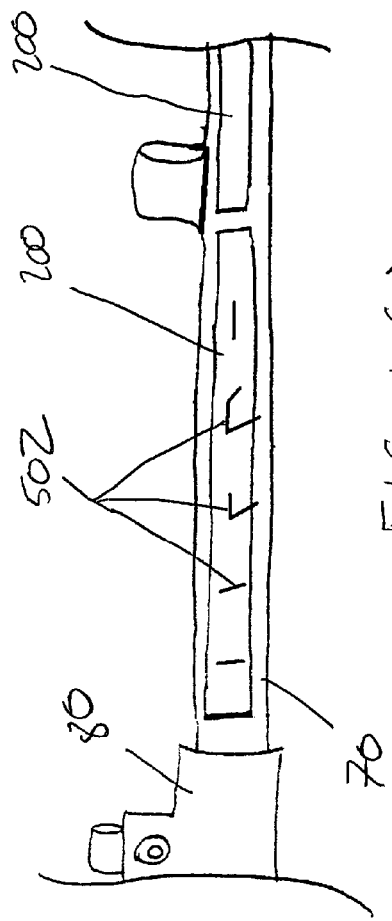
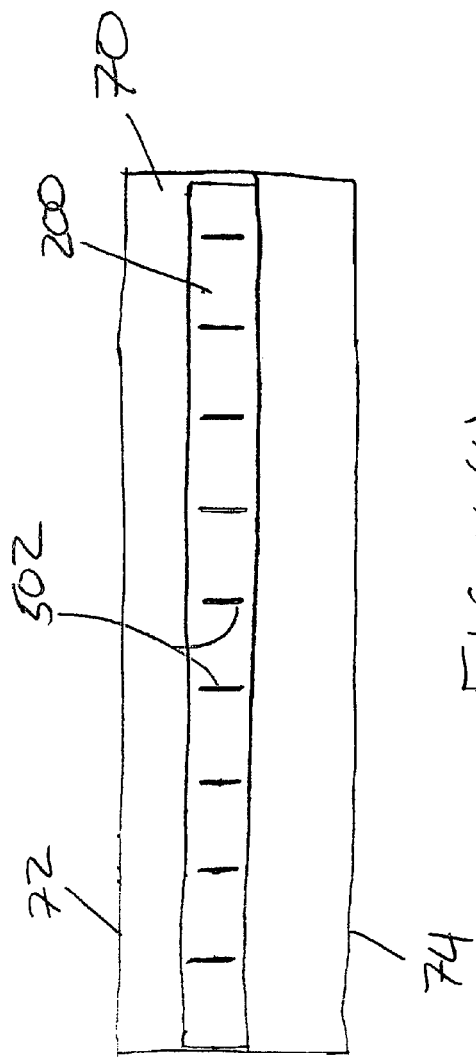

TWIST RESISTANT HEAD SIDE AIRBAG

BACKGROUND

The present invention relates generally to the field of airbags and inflatable safety devices. More specifically, the invention relates to airbag with a non-stretching attachment point that will not twist during shipping, installation or handling.

Head side airbag modules are typically referred to as "rigid modules," "soft pack modules," or a combination thereof. As an example, it is very common to use a full length steel tube or full length plastic container as a rigid feature, thus defining the "rigid module." The rigid module, however, demands tight tolerances and expensive checking fixtures, and yields high amounts of scrap material because the mounting features of the conventional "rigid module" must be constrained in X, Y and Z directions over the entire length of the module. As an example, a dimensionally correct rigid module that becomes bumped or mishandled during shipping and handling may no longer fit in the vehicle during installation. The attachment points along the module have no flexibility; thus resulting in assembly features being misaligned during installation. As a result, the rigid module remains unused because the mating features will not align properly.

Generally, conventional modules are rigid over a portion of its length while not being rigid over the balance. A "soft pack" portion of a head side airbag module refers to those portions that do not have any rigid features. However, a module that has a "soft pack" portion has the possibility of becoming twisted during the shipping, the handling and/or the installation into a vehicle. A module that is twisted or installed incorrectly may reduce the performance of the airbag upon deployment during a crash event.

Thus, there is a need for an airbag module that can be resistant to damage from shipping, handling, and installation while allowing for variations in manufacturing tolerances.

SUMMARY

The twist resistant head side airbag module according to embodiments of the present invention utilize one or more ant-twist members, which can be a thin strip or multiple strips of material that are cut to predetermined lengths and attached to the airbag module at various points along its length.

According to one embodiment of the present invention, an airbag module can comprise: an airbag for protecting a vehicle occupant; at least one anti-twist member attached to the airbag at a plurality of points along a length of the airbag; and one or more fasteners for attaching the at least one anti-twist member to the airbag.

According to another embodiment of the present invention, an airbag module can comprise: an airbag for protecting a vehicle occupant; and an anti-twist assembly attached to the airbag for preventing the airbag from twisting and for preventing the airbag from being stretched during installation.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 1(a) through 1(d) are views of an airbag used with an anti-twist assembly according to various embodiments of the present invention. FIG. 1(a) shows the airbag in an unfolded state. FIG. 1(b) shows the folded airbag contained by a cover. FIG. 1(c) shows the folded airbag contained by a containment loop. FIG. 1(d) shows the folding airbag contained by loop straps.

FIG. 2 is a view of an airbag module according to an embodiment of the present invention.

FIG. 3 is a view of an anti-twist member according to an embodiment of the present invention.

FIG. 4(a) is a front view of the anti-twist member. FIG. 4(b) is a view of the anti-twist member of FIG. 4(a) taken along sectional line C-C. FIG. 4(c) is a detail view of an alternative living hinge used in an embodiment of the anti-twist member.

FIG. 5(a) shows the airbag module in the laid open position. FIG. 5(d) shows the airbag module in a fully folded condition.

FIGS. 6(a) and 6(d) illustrate the process of folding the airbag module according to another embodiment of the present invention so as to reduce its overall length. FIG. 6(a) shows the airbag module in the laid open position. FIG. 6(b) shows the airbag module after an initial fold. FIG. 6(c) shows the airbag module after a second fold.

FIG. 6(d) shows the airbag module in a fully folded condition.

FIG. 7 is a detail view of the airbag module of FIG. 1 in a non-twisted orientation and showing the attachment points of the anti-twist assembly according to an embodiment of the present invention.

FIG. 8(a) is a detail view of the airbag module twisted 180 degrees. FIG. 8(b) is a detail view of the airbag module twisted approximately 360 degrees.

FIGS. 10(a) and 10(b) are detail views of an airbag module according to another embodiment of the invention in which an anti-twist assembly is sewn to the airbag module. FIG. 10(a) shows an anti-twist member attached to the outside of a cover.

FIG. 10(b) shows a cover laying flat prior to wrapping around the airbag in which an anti-twist member is attached to the inside of the cover.

DETAILED DESCRIPTION

Figure 1A:
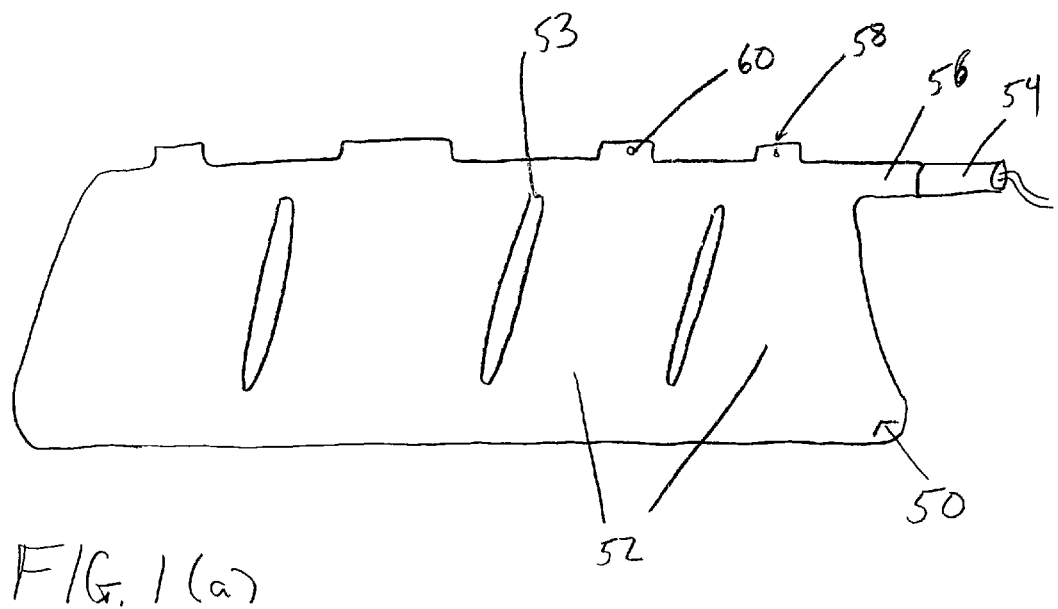

Description of various embodiments of the present invention will be described in reference to the figures. FIGS. 1(a) through 1(d) shows examples of an airbag 50 that is used with the anti-twist assembly of the present invention and the mechanisms used to keep the airbag in a folded state during the storage, the transport, and the installation of the airbag in a vehicle. FIG. 1(a) shows that the airbag 50 in the unfolded state. The airbag 50 can be a curtain airbag used to protect vehicle occupants against impacts with the side portions of the interior cab of a vehicle during a crash event. Although the following disclosure relates to a curtain airbag, other types of airbags are contemplated, such as a head side airbag module, or any other type of airbag module.

Attached to the airbag 50 is a gas generator 54, which is used to inflate the airbag during an event of an emergency. The airbag 50 itself can include one or more inflatable portions 52 divided by seams 53, a passage way 56 that allows fluid communication between the gas generator 54 and the inflatable portions 52, and a series of attachment tabs 58. The attachment tabs 58 includes one or more apertures 60, which are used to mount the airbag to the frame or other supporting structure in the vehicle through the use of alignment pins being fed through the apertures 60 and into locator holes in the vehicle.

Figure 1B:
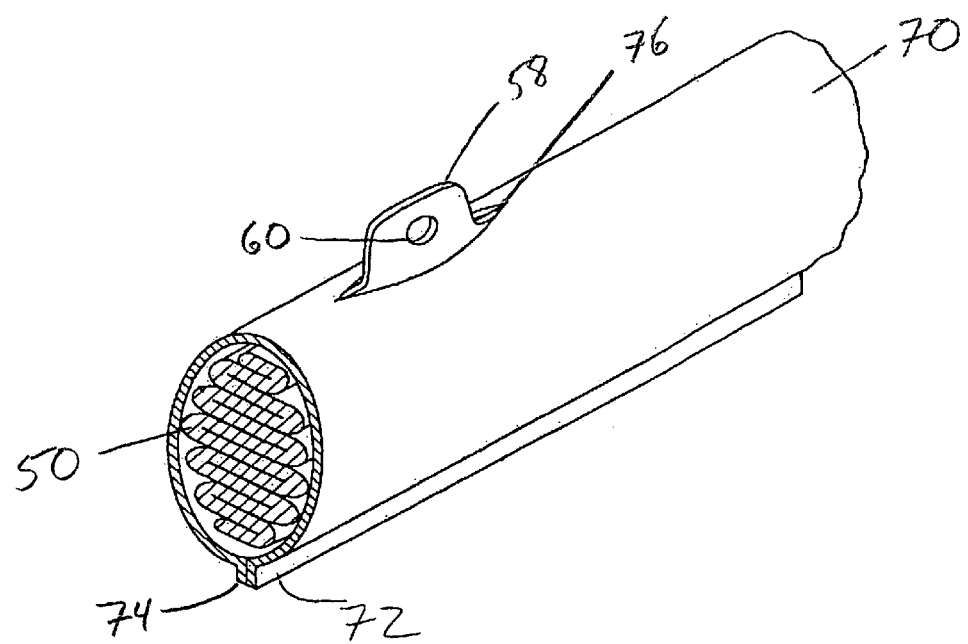

The airbag 50 can be typically folded up before it is to be stored, transported, or mounted in the vehicle. FIG. 1(b) shows an embodiment in which the folded airbag 50 is placed inside a cover 70 which can be a sheet of suitable fabric. The sheet has two edges 72 and 74 that are folded around the folded airbag 50 and abut against each other. A seam can then be placed at the abutment of edges 72 and 74 such that the cover wraps around the airbag so that the airbag is kept in the folded position during storage, transport, and installation. The seam should be configured to break when the airbag is inflated in the event of an emergency, such as a crash event. The cover 70 also includes one or more slits 76 through which the attachment tabs 58 can be fed through so that the alignment pins can be fed through the aperture 60 and its corresponding locator hole in the vehicle during installation.

FIG. 1(c) shows another embodiment in which containment loops 80 encircle the folded airbag 50 at various locations along the length of the airbag 50. The containment loop 80 can be a strap of fabric in which the two ends of the fabric are sewn together using a seam 88. The seam should be configured to break when the airbag is inflated in the event of an emergency, such as a crash event. The containment loops also can include an aperture 86 through which the attachment tabs 58 can be fed through so that the alignment pins can be fed through the aperture 60 of the attachment tab 58 and the locator holes of the vehicle. Optionally, the containment loop 80 can include a tab 82 located at one of the edges of the aperture 86 that can be overlapped onto the attachment tab 58 of the airbag 50. The tab 82 also includes an aperture 84 which is in alignment with aperture 60 of attachment tab 58 so that the alignment pins can be fed through both apertures 60 and 84.

FIG. 1(d) shows an embodiment in which the folded airbag 50 is contained in the folded position with a series of loop straps 90 made from strips of material that are wrapped around the airbag, and sown together by seams 92. The seam should be configured to break when the airbag is inflated in the event of an emergency, such as a crash event.

FIG. 2 illustrates an airbag module 100 according to an embodiment of the invention. The airbag module 100 can include the airbag 50, the gas generator 54, a mounting bracket 110, and the anti-twist assembly 120. The folded airbag 50 used in the airbag module 100 can retain its folded state through the use of the cover, one or more containment loops, one or more looped straps, or any combination thereof. In the embodiment shown in FIG. 2, the folded airbag 50 is retained in the folded state through the use of containment loops 80.

A mounting bracket 110 can optionally be used for extra support for the mounting of the gas generator 54, if desired. The mounting bracket 110 only partially surrounds the passage way 56 of the airbag 50 through the use of a substantially half circle portion with two flat plates 112 attached to either end of the half circle. One of the flat plates includes apertures 114 in which alignment pins are fed through and attach to locator holes in the vehicle.

The anti-twist assembly 120 is attached or coupled to the airbag 50 using one or more anti-twist members. For example, the one or more anti-twist members can be segmented strips 122a, 122b, and 122c (shown in FIGS. 2 and 5(a)) or one continuous strip 122d (shown in FIG. 6(a)). The anti-twist members are arranged on the airbag 50 such that the entire airbag module 120 can be folded up for storage, transport, and handling while still being able to be correctly assembled to a vehicle. The anti-twist assembly 100, and particularly the one or more anti-twist members, does not elongate or stretch. Rather, the anti-twist assembly 120 prevents the airbag module 100 from be installed incorrectly, such as when twisted (as will be described latter).

The anti-twist members are made of material that is flexible enough to allow the airbag module 100 to be folded without stretching or elongation. If an attempt is made to twist the module, the material of the anti-twist assembly will resist and make it difficult for an assembly operator to incorrectly assemble the airbag module. For example, the anti-twist members may be comprised of plastic (such as polypropylene), steel, stainless steel, or any other suitable material.

FIG. 2 shows the anti-twist members 122a through 122c. Each anti-twist member can be of fixed length or have a living hinge 202. The anti-twist members 122a and 122c of FIG. 2 are of similar configuration as the individual anti-twist member 200 shown in FIG. 3. The anti-twist member 200 can be a strip of material with one or more apertures 124. The apertures 124 align with the apertures 60 of the airbag 50 so that alignment pins can be fed through the apertures 60 and 124. The alignment pins are then fixed into place in these apertures so that the anti-twist member 120 becomes fixed to the folded airbag 50 as seen in FIG. 2. For example, the alignment pins can be bolts that are fed through the aperture 60 and the aperture 124. Once the bolts are fed through both apertures, a washer and nut are attached to the bolt so as to fix the airbag and anti-twist member together. Besides the use of bolts, washers, and nuts, any other suitable fastening device can be used.

The length L, the centerline distance between the apertures 124, and the thickness of the anti-twist member 200 can be varied depending on the shape, length, and configuration of the attachment tabs 58 of the air bag 50. For example, the anti-twist member 122a in FIG. 2 can have a length L of about 25±1 cm (1±0.04 in) while the anti-twist member 122c in FIG. 2 can have a length L of about 40±1 cm (1.6±0.04 in). In one embodiment, the thickness of the anti-twist members 122a and 11c can be about 1±0.1 cm (0.4±0.004 in).

Figure 4A:
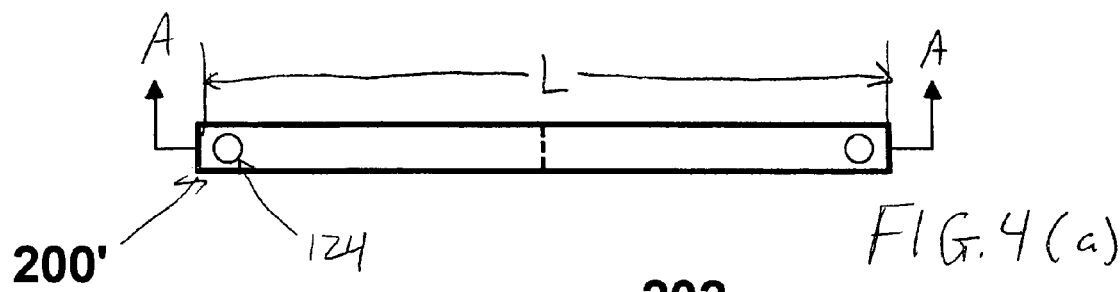
FIGS. 4(a) through 4(c) are views of the anti-twist member with a living hinge according to embodiments of the present invention.
Figure 4B:
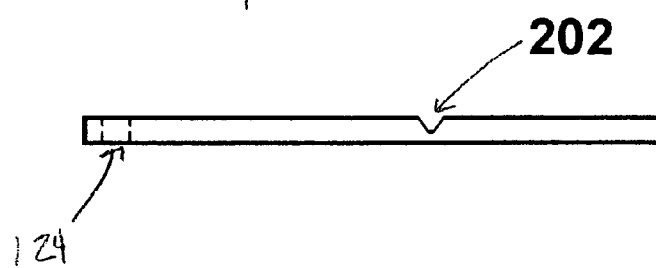

FIGS. 4(a) and 4(b) shows another embodiment of an anti-twist member 200' with a living hinge. Such an anti-twist member is the anti-twist member 122b in FIG. 2. The anti-twist member 200' can include two apertures 124 for alignment with the apertures 60 of the attachment tabs 58 for attachment with the alignment pins. The length L, the centerline distance between the apertures 124, and the thickness of the anti-twist member 200' of FIGS. 4(a) and 4(b) can also be varied depending on the shape, length, and configuration of the attachment tabs 58 of the air bag 50. For example, the anti-twist member 122b in FIG. 2 can have a length L of about 135±1 cm (5.3±0.04 in) and the thickness of about 1±0.1 cm (0.04±0.004 in).

The anti-twist member 200' of FIGS. 4(a) and 4(b) has a living hinge 202. The living hinge can be, for example, a thin section of material that allows the anti-twist member to bend. The living hinge 202 allows for bending and folding of the airbag module 100 for storage, handling and transport. The living hinge 202 can be used in one location on the anti-twist member, such as on the anti-twist member 122b shown in FIG. 3(b), or in a plurality of locations, such as on the anti-twist member 122d shown in FIG. 6(a).

Figure 4C:
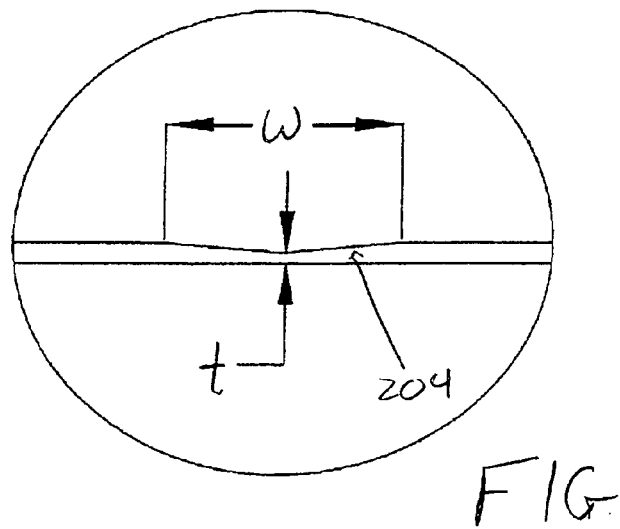

In FIG. 4(b), the living hinge is a V-shaped groove but other configurations can also be used. For example, FIG. 4(c) shows a detail view of an alternative living hinge for the anti-twist member 200 with a more gradual thinning portion 204. In one embodiment, when the length of the anti-twist member 122b is about 135±1 cm (5.3±0.04 in) and the thickness of about 1±0.1 cm (0.04±0.004 in), the width W of the thinning portion 204 can be about 10±1 cm (0.4±0.04 in) and the thickness t of the material at the deepest part of the hinge can be about 0.5±0.1 cm (0.2±0.004 in).

Although FIGS. 2 and 4(a) and 4(b) show the living hinge near the center of the anti-twist member, the living hinge 202 can placed at any suitable location or plurality of locations along the anti-twist member.

Of course, any combination of fixed length, living hinge or other type of anti-twist members may be used in an anti-twist assembly. For example, FIG. 2 shows the use of three anti-twist members in which the members 122a and 122c are fixed length members while the member 122c has a living hinge. In the embodiment of FIG. 2, the anti-twist members may or may not overlap. For example, the left aperture of the anti-twist members 122c and the right aperture of the anti-twist member 122b may align with the aperture 60a of attachment tab 58 and overlap each other. Similarly, the right aperture of the anti-twist member 122a and the left aperture of the anti-twist member 122b may align with the aperture 60b or 60c and overlap each other. Alternatively, the left aperture of the anti-twist member 122b may align with the aperture 60b while the right aperture of the anti-twist member 122a may align with the aperture 60c; thus, there is no overlap with the left aperture of the anti-twist member 122b and the right aperture of the anti-twist member 122a.

Figure 5A:
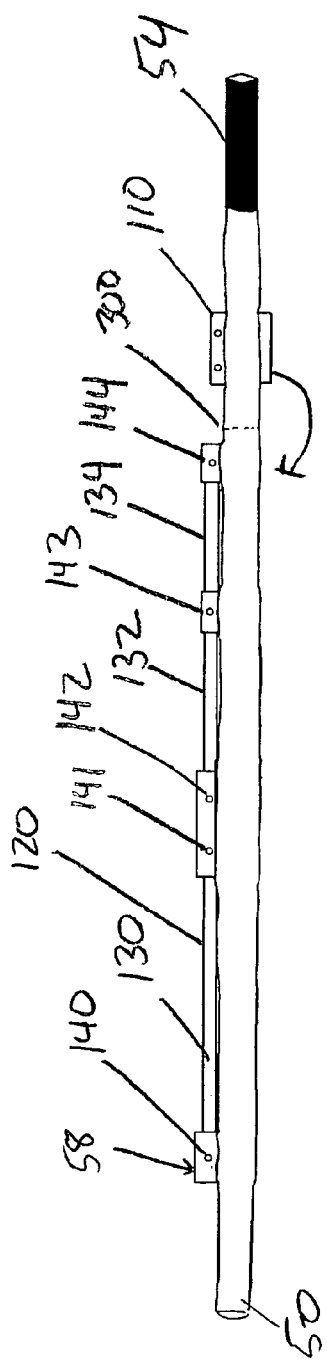
FIGS. 5(a) and 5(d) illustrate the process of folding the airbag module according to an embodiment of the present invention so as to reduce its overall length.

FIGS. 5(a) through 5(d) illustrates an airbag module 100 with the anti-twist assembly 120 can be folded to reduce the length of the airbag module 100. FIG. 5(a) depicts an airbag module 100 in the laid open position. The airbag 50 is covered by a cover 70 and the attachment tabs 58 protrude out from slits in the cover as seen in FIG. 1(b). The anti-twist assembly 120 is connected to the airbag 50 in which the anti-twist assembly 120 comprises of three fixed length segments 130, 132, and 134 that are connected to the attachment tabs 58. The apertures of the anti-twist member 130 are aligned with the apertures 140 and 141; the apertures of the anti-twist member 132 are aligned with the apertures 142 and 143; and the apertures of the anti-twist member 134 are aligned with the apertures 143 and 144. Thus, the only aperture that has overlapping anti-twist members is aperture 143. Alignment pins, such as bolts are fed through each combination of apertures and fixed with a nut and washer such that the anti-twist members are attached to their respective tabs.

Figure 5B:
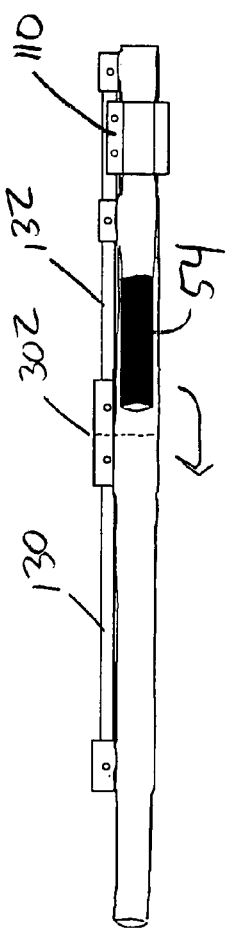
FIG. 5(b) shows the airbag module after an initial fold.
Figure 5C:
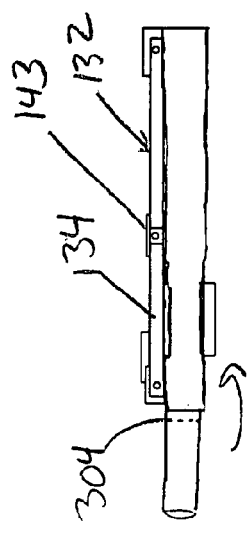
FIG. 5(c) shows the airbag module after a second fold.
Figure 5D:

In one embodiment of the present invention, the airbag module 100 of FIG. 5(a) can have an overall length of about 234 cm (92 inches). In an initial fold from FIGS. 5(a) to 5(b), the right end of the airbag module 100 is folded over at point 300 so that the gas generator 54 rests on top of the airbag module 100 as seen in FIG. 5(b). After an initial fold of the module, shown in FIG. 5(b), the airbag module 100 is reduced in length by about 61 cm (24 inches). The module is folded again from right to left along point 302 near a point between the edges of the anti-twist members 130 and 132 such that the gas generator 54 is now between a front and back layer of the airbag 50 as seen in FIG. 5(c). Note that in this view the overlapping of the anti-twist members 132 and 134 can be seen at aperture 143. There is one more final folding at point 304 from left to right, which results in the folded condition shown in FIG. 5(d). After the final folding, the airbag module 100 can be reduced to only about 61 cm total (24 inches), which is approximately 173 cm (68 inches) less than a conventional "rigid" module.

In another embodiment of the present invention, FIGS. 6(a) through 6(d) illustrates an airbag module 100 with the anti-twist assembly 120 in which one continuous anti-twist member 122d with two living hinges 202a and 202b is used. In this embodiment, similar to FIG. 2, the airbag 50 has containment loops 80 for retaining the airbag in the folded condition. FIG. 6(a) depicts an airbag module 100 in the laid open position. As with the embodiment shown in FIG. 2, the anti-twist member 122d has apertures that align with the apertures 60 of attachment tabs 58. Alignment pins, such as bolts, are fed through the aligned apertures; and then a washer and nut are attached so as to secure the anti-twist member 122d to the airbag 50.

In an initial fold from FIGS. 6(a) to 6(b), the right end of the airbag module 100 is folded over at point 300 so that the gas generator 54 rests on top of the airbag module 100 as seen in FIG. 6(b). After the initial fold of the module, shown in FIG. 6(b), the airbag module is folded again along point 302 near the proximity of the living hinge 202a such that the gas generator is now between a front and back layer of the airbag 50 as seen in FIG. 6(c). There is one more final folding at point 304 near the proximity of the living hinge 202b, which results in the folded condition shown in FIG. 6(d). After the final folding, the airbag module 100 is compact and ready for storage or transport.

When the airbag module 100 is ready for installation into the vehicle, the anti-twist assembly may provide the benefit of permitting easier and more accurate installation.

FIG. 7 illustrates the airbag module 100 with the anti-twist assembly 120 in an initial and desired non-twisted orientation. In the orientation shown, the airbag module 100 is capable of being attached and assembled to a vehicle by using the alignment pins 402, which protrude through the apertures 60 of the airbag and the apertures 124 of the anti-twist member. The alignment pins fit in locator holes 404 of the vehicle and are attached to these locators holes in any manner known in the art. As can bee seen in FIG. 7, each anti-twist member 200 maintains the distance between the apertures 60 relative to each other, i.e., the airbag does not become twisted.

Figure 8A:
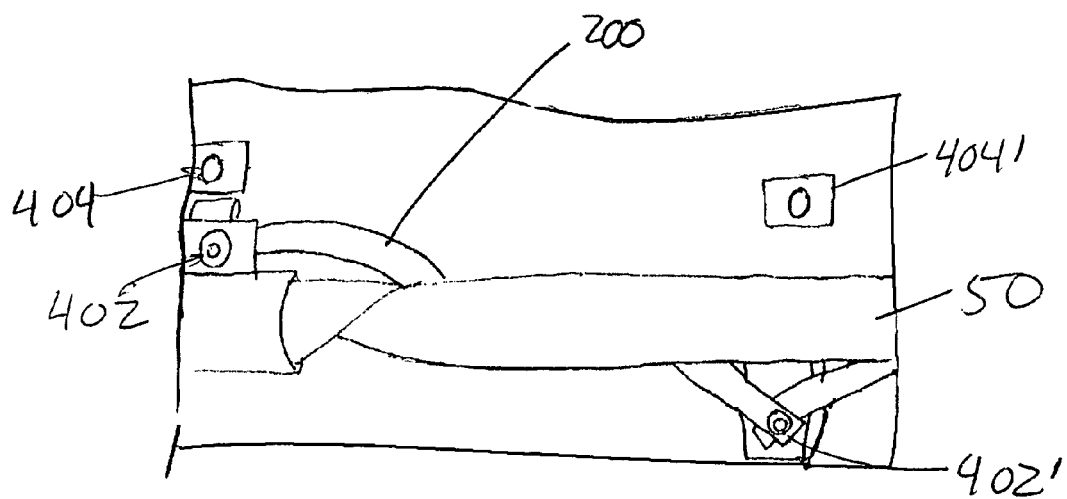
FIGS. 8(a) and 8(b) illustrate the airbag module of FIG. 1 in twisted orientations.
Figure 8B:
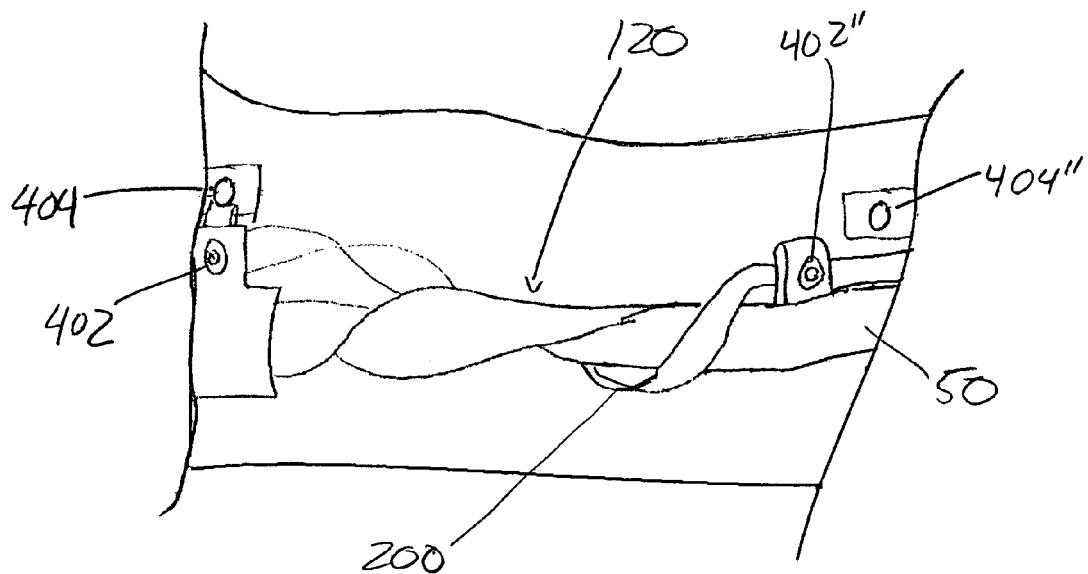

FIGS. 8(a)-8(b) illustrate different twisting orientations of the airbag module 100 in which the airbag module 100 is not capable of being installed into a vehicle because of the use of the anti-twist assembly 120. FIG. 8(a) shows the airbag module twisted approximately 180 degrees. In this configuration, an attachment pin 402' is not in a position to reach a locator hole 404'; thus, it is not possible to mistakenly install the airbag module in this configuration because the attachment pins do not line up with the locator holes.

FIG. 8(b) shows the airbag module 100 twisted approximately 360 degrees. Without the anti-twist members, an installer of the airbag module may mistakenly install the airbag module 100 incorrectly by stretching the airbag in the longitudinal direction so at to fit the alignment pins into the locators holes of the vehicle. However, because the anti-twist members are attached to the airbag and they do not elongate, it is not possible for the installer to stretch the airbag so that the alignment pins fit inside the locator holes. In other words, even though the airbag module 100 is twisted completely around causing the length of the airbag module to shorten, the anti-twist assembly 100 will prevent the airbag from elongating due to stretching so that the alignment pin 402' is forced into its proper position, i.e., to be able to reach locator hole 404'. Thus, even though the leftmost alignment pin 402 can be attached to the vehicle, the rightmost alignment pin 402' is twisted and cannot reach its corresponding locator hole. Therefore, the anti-twist assembly ensures that the airbag module is installed correctly by keeping the apertures 60 and their corresponding alignment pins 402 in their proper configuration, i.e., prevents twisting and then stretching of the airbag.

Additionally, the anti-twist assembly and its constituent members prevent the airbag module from twisting in the first place. For example, if the airbag module is twisted by some force so as to result in the configuration shown in FIGS. 8(a) and 8(b), the anti-twist assembly would resist such twisting such that, once the force causing the twisting is removed, the airbag module will spring back to its proper untwisted configuration.

Figure 9:
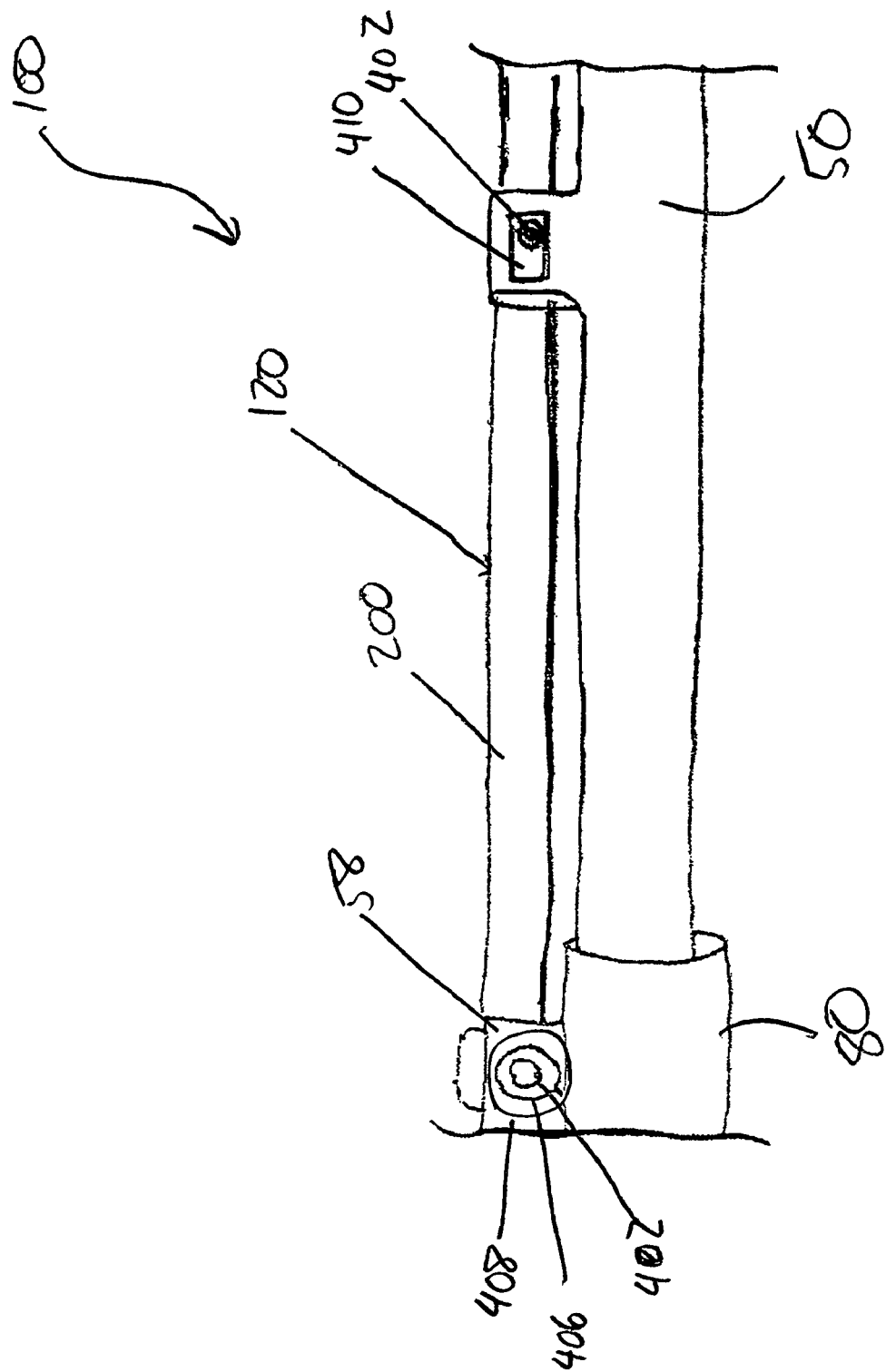
FIG. 9 is a detail view of the airbag module showing the attachment points of the anti-twist assembly according to an embodiment of the present invention.

FIG. 9 is a detail view showing the attachment points of the anti-twist assembly 120 to the airbag 50 according to an embodiment of the present invention. As previously mentioned and shown in FIG. 9, the anti-twist assembly members 200 can be fixed between the attachment tabs 58 of the airbag module 100 at attachment locations. The apertures of the anti-twist members 200 align with the apertures 60 of the attachment tabs 58. The alignment pins 402 are fed through the apertures, wherein a fastening device is used to keep the attachment tabs 58 and the anti-twist members together. For example, FIG. 9 shows the use of bolts as the alignment pins 402 in which, once the bolt is fed through, a washer 408 is placed around the bolt 402, followed by a nut 406 being screwed onto the bolt. Alternatively, a rectangular plate 410 can be used instead of the washer 408. In another alternative, the washer 408 and the nut 406 can be replaced with a threaded rectangular or other shaped plate. In other alternatives, other types of fasteners can be used.

FIGS. 10(a) and 10(b) are views showing another method for attaching the anti-twist members to the airbag. In these figures, the airbag 50 includes a cover or sock 70 in which the anti-twist members can be sewn by stitched seams into the cover 70. As previously mentioned, the cover 70 surrounds the airbag 50 and opens up during inflation of the airbag, i.e., the seams of the airbag break upon the inflation of the airbag.

FIG. 10(a) shows the anti-twist members 200 attached to the outside of the cover 70. The stitched seams 502 can take a variety of different configurations as shown in FIG. 10(a). In addition, the seams 502 can be placed at a plurality of locations along the longitudinal direction of the anti-twist members 200. The stitched seams may be placed at regular intervals or at only specified locations. FIG. 10(b) shows an anti-twist member 200 attached by sewn seams 502 to the inside of the cover 70 before the edges 72 and 74 are sewn together with a breakable seam and placed over the airbag 50. As in the case of FIG. 10(a), any configuration and placement of the stitching seams can be used.

Figure 11:
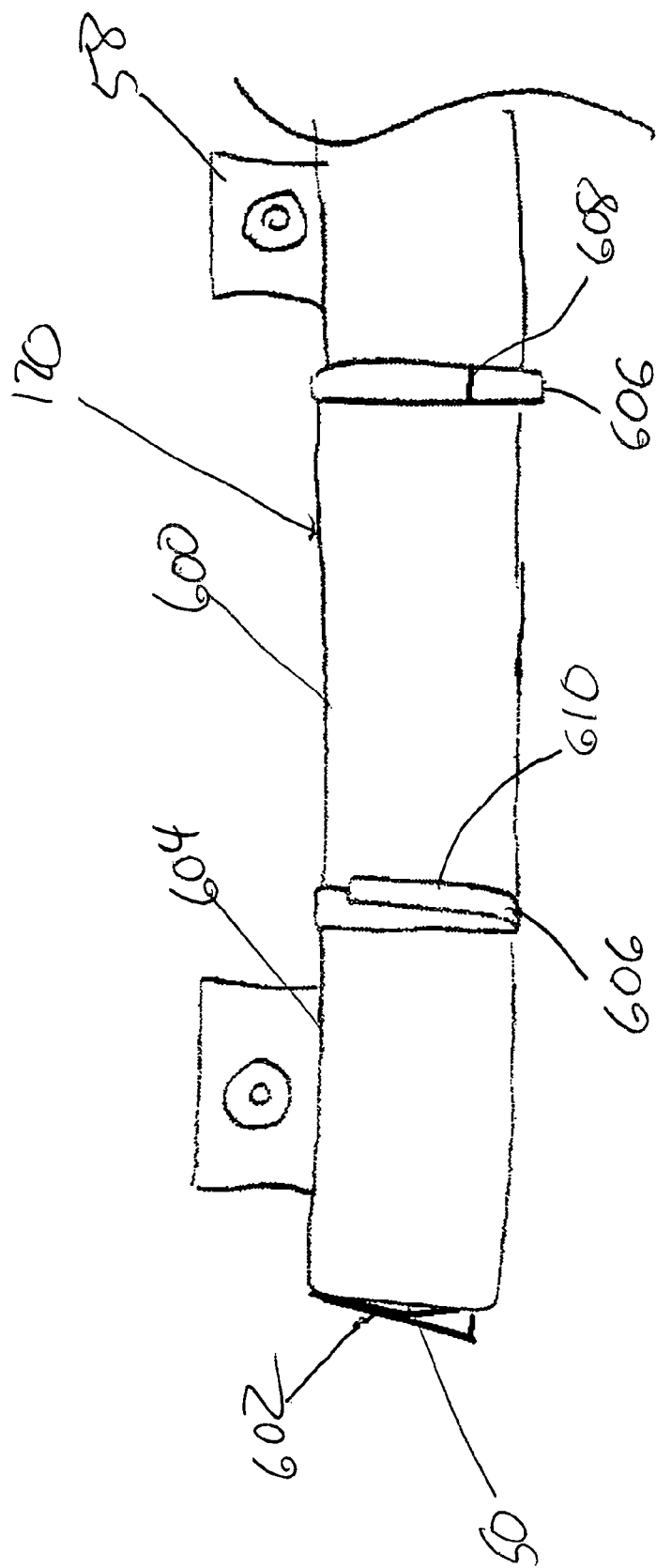
FIG. 11 is a detail view of an airbag module according to another embodiment of the invention in which the anti-twist assembly is wrapped around the airbag module.

FIG. 11 shows another embodiment of the present invention in which the anti-twist assembly wraps around the airbag. In this case, the anti-twist assembly 120 comprises an anti-twist member 600 that is bent into a V-shape 602 such that the vertex of the V-shape runs along the top of the airbag. Slits 604 are cut at selected locations along the vertex of the V-shape so as to accommodated the attachment tabs 58 of the airbag. The anti-twist assembly members are wrapped around the airbag 50 and can be tied shut using bands 606 at predetermined locations. The bands 600 can be fabric strips that a sewn into loops using breakable seams 608 or an adhesive so that the loops will break when the airbag 50 inflates in the case of an emergency. Because the anti-twist member 600 is wrapped around the airbag, the anti-twist member 600 could provide extra protection to the airbag 50 from damage until the airbag module becomes secured to the vehicle. The members could even integrate localized features like deployment ramps and tear seams. The integrated functionality will serve to reduce the component complexity of the airbag module by reducing the number of sub-components required, such as, for example, reducing the need for plastic containers, full length gas tubes, localized ramps, fabric covers or socks, etc. In addition, the V-shaped member can also include living hinges such that the assembly can be folded.

Beside the attachment methods used in FIGS. 9 through 11, other types of fasteners can be used to attach the anti-twist members to the airbag module. Such fastening methods can comprise one or more of the following: (1) fastening using the supplied airbag module installation fasteners; (2) fastening using mechanical fasteners like rivets, toggle locks, etc.; (3) sewing or weaving the anti-twist member into the airbag via fabric loops; (4) sewing the anti-twist member directly to the airbag; (5) sewing or weaving the anti-twist member to a fabric cover of the airbag (inside or outside of the cover); (6) welding the anti-twist member to the airbag module via heat stake, ultrasonic or similar process; (7) attaching the anti-twist member with tape or other adhesives; (8) wrapping the anti-twist member around the airbag module; and (9) any other suitable method.

As disclosed, the disclosed anti-twist assembly for an airbag module and its various embodiments can provide a number of advantages such as: (1) reducing the opportunity of the airbag module from being twisted during handling, shipping and installation into a vehicle; (2) allowing the length of the airbag module to be folded upon itself to reduce the size of packaging required; (3) improving the ease of installing the airbag module into a vehicle because the installer can more easily handle a folded up airbag module than a rigid, longer airbag module; (4) allowing less stringent manufacturing tolerances to be held while offering improved assembly tolerances by using a flexible module; and (5) avoiding human errors during assembly by preventing the installer from mistakenly installing a twisted airbag module because the anti-twist material does not stretch or elongate (thus, the assembly is "Poka Yoked").

Thus, the present application discloses an apparatus and method that can eliminate the need for long rigid features typically used for making assembly more easy and to prevent the airbag module from twisting. In addition, the anti-twist assembly can provide cost benefits because the manufacturing tolerances on the airbag module and sub-components can be lower than the tolerances with conventional modules, such as the "rigid modules." The rigid module demands tight tolerances and expensive checking fixtures while yielding high amounts of scrap material because of damage during shipping and handling. In contrast, the flexible anti-twist assembly of various embodiments of the present invention can be more resistant to shipping and handling damage as well as allowing variations in manufacturing tolerances due to the fact that its assembly points are constrained only by length.

In addition, the anti-twist assembly members can be of fixed length, with multiple members used in multiple positions per airbag module.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module for a vehicle, comprising:
   an airbag for protecting a vehicle occupant; wherein the airbag is folded and is configured to deploy along an interior side portion of the vehicle;
   an anti-twist assembly attached to the airbag at a plurality of points along a length of the airbag; and
   one or more fasteners for attaching the anti-twist assembly to the airbag,
   wherein the anti-twist assembly and airbag are configured to be folded along a longitudinal direction of the anti-twist assembly such that a first portion of the anti-twist assembly overlaps a second portion of the anti-twist assembly such that the first and second portions of the anti-twist assembly run alongside each other in the longitudinal direction, and
   wherein the anti-twist assembly comprises a strip of material extending longitudinally along the length of the airbag.

2. The airbag module according to claim 1, wherein the strip of material is flexible but does not elongate in the longitudinal direction.

3. The airbag module according to claim 1, wherein the anti-twist assembly comprises at least two apertures.

4. The airbag module according to claim 3, wherein the airbag includes at least two tabs, wherein each tab includes an aperture which aligns with an aperture of the anti-twist assembly.

5. The airbag module according to claim 4, wherein alignment pins are fed through the apertures of the anti-twist assembly for securing the anti-twist assembly to the airbag.

6. The airbag module according to claim 1, wherein the anti-twist assembly includes three anti-twist members.

7. The airbag module according to claim 1, wherein the strip of material comprises at least one of plastic, steel, and stainless steel.

8. The airbag module according to claim 1, wherein the strip of material comprises at least one living hinge.

9. The airbag module according to claim 1, wherein the anti-twist assembly is attached to the airbag by at least one of the following: mechanical fasteners, sewn stitches, straps, welding, and adhesives.

10. The airbag module according to claim 1, wherein the airbag is folded and wherein the module further comprises a cover encapsulating the airbag, wherein the anti-twist assembly is sewn to the cover.

11. The airbag module according to claim 1, wherein the anti-twist assembly is V-shaped and the airbag is disposed inside the V-shape.

12. The airbag module according to claim 1, wherein the anti-twist assembly comprises one or more living hinges.

13. The airbag module according to claim 1, wherein the anti-twist assembly and airbag are configured to be folded along the longitudinal direction of the anti-twist assembly such that a first portion of the airbag overlaps a second portion of the airbag such that the first and second portions of the airbag run alongside each other in the longitudinal direction.

14. The airbag module according to claim 1, wherein the anti-twist assembly and airbag are configured to be folded along the longitudinal direction of the anti-twist assembly such that a first portion of the airbag abuts a second portion of the airbag as the second portion of the airbag runs alongside the first portion of the airbag in the longitudinal direction.

15. An airbag module, comprising:
    a side curtain type airbag configured to be stored along a side of a vehicle; and
    an anti-twist assembly attached to the airbag for preventing the airbag from twisting and for preventing the airbag from being stretched during installation,
    wherein the anti-twist assembly and airbag are configured to be folded along a longitudinal direction of the anti-twist assembly such that a first portion of the anti-twist assembly overlaps a second portion of the anti-twist assembly such that the first and second portions of the anti-twist assembly run alongside each other in the longitudinal direction.

16. The airbag module according to claim 15, wherein the anti-twist assembly comprises one or more anti-twist members attached to the airbag at a plurality of points along a length of the airbag.

17. The airbag module according to claim 16, wherein the anti-twist member comprises at least two apertures, and wherein the airbag includes at least two tabs, wherein each tab includes an aperture which aligns with an aperture of the anti-twist member.

18. The airbag module according to claim 17, wherein alignment pins pass through the apertures of the anti-twist member for securing the anti-twist member to the airbag.

19. The airbag module according to claim 15, wherein the anti-twist assembly and airbag are configured to be folded along the longitudinal direction of the anti-twist assembly such that a first portion of the airbag overlaps a second portion of the airbag such that the first and second portions of the airbag run alongside each other in the longitudinal direction.

20. The airbag module according to claim 15, wherein the anti-twist assembly and airbag are configured to be folded along the longitudinal direction of the anti-twist assembly such that a first portion of the airbag abuts a second portion of the airbag as the second portion of the airbag runs alongside the first portion of the airbag in the longitudinal direction.

* * * * *